United States Patent Office 3,029,184
Patented Apr. 10, 1962

3,029,184
PROCESS FOR CONTROLLING ANIMAL
GROWTH RATE
Willard J. Visek, Chicago, Ill., assignor, by mesne assignments, to the United States of America as represented by the United States Atomic Energy Commission
No Drawing. Filed Mar. 18, 1960, Ser. No. 15,787
3 Claims. (Cl. 167—53)

This invention relates to a method of growth control and a product for that control.

It has heretofore been known that antibacterial agents such as antibiotics, when used in trace quantities, enhance the growth of animals and birds.

It has generally been agreed that the effect of these agents has been brought about by action on the bacterial flora so that less food is required to produce a unit of weight gain. Acting on the assumption that the beneficial effect of these antibacterial agents has been brought about by their effect upon the ammonia producing bacterial-enzyme systems of the animals, I have determined that the introduction or production of anti-urease and its introduction to the animal in a tolerable form will act in a manner similar to the antibiotics. Applicant makes no representation to the effect that the method of this invention is useful in controlling growth of humans, it not being established whether the effects of the method on humans are correlatable with its effects on lower animals. For this reason, the method of the invention is specifically intended only for lower animals.

The anti-urease is preferably produced naturally within the animal by the injection of highly purified urease (crystalline preferred) with resultant natural production of the antibodies therefor within the animal itself. On the other hand, anti-urease may be produced and injected itself, where desired. Normally, the first method will be preferred because of its relative inexpensiveness.

The urease or anti-urease material is injected parenterally in saline solution, preferably neutral pH. A unit of urease activity is defined as the amount of enzyme required to produce 1 mgm. of ammonia nitrogen at 20° C. at neutral pH in a saline phosphate buffer acting upon a urea substrate. A unit of anti-urease activity is defined as that amount which will inhibit one unit of activity of urease.

In mammals, about 80 units of urease activity per kilogram or body weight has been shown to be lethal. It is therefore preferred to stay well within this limit, as for example not above 10 units of activity as a starting dose. After immunization, however, the dosage may be greatly increased. In birds the lethal dose is much higher, dosages as high as 250 units of activity per kilogram having been employed safely.

The following are examples of the invention:

Male weanling rats were intraperitoneally injected with solutions of jackbean urease over a period of 4 weeks. During and after this period, for a total of 8 weeks, both feed intake and weight gain were measured. In two successive experiments each with 10 control and 20 experimental rats, no differences were found between treatments in growth or feed required per gram of growth during the injection period. However, in the post-injection 4 weeks the urease treated animals gained about 10 percent more weight than did the controls and the feed required per gram of gain was reduced by a like amount. This latter effect is significant at the 5 percent level in both experiments and the same is true for the feed per gram of gain, figured for the whole 8 week period of each experiment. The sera of the immunized animals contained anti-urease which inhibited the in vitro ureolytic activity of the gastrointestinal contents of these animals. A soybean oil meal diet was fed.

Antibacterial agents such as antibiotics, sulfonamides and organic arsenicals have been shown to enhance growth of animals and birds when added at trace levels to the diet. There is general agreement that these agents affect the bacterial flora in a manner which is beneficial to the host. A consequence of this effect is a frequently observed reduction in the amount of food required to produce a unit of weight gain in growing animals. Some investigators have postulated that the antimicrobial agents increase the availability of essential growth factors. Others have suggested that toxins of microbial origin are removed or their production is inhibited (1, 2, 4). Ammonia has been suggested as one of the toxins whose production is inhibited (3, 8, 9).

We have recently observed that the addition of three antimicrobial agents, penicillin, chlortetracycline and arsanilic acid, to a casein diet at 100 p.p.m. significantly decreased in vivo hydrolysis of C-14 urea by rats and reduced production of urease by their gastrointestinal bacteria (10). Urease is the only enzyme known to split urea to $CO_2$ and $NH_3$ and in vivo urea hydrolysis is an enzymic process. Urea, the specific substrate for urease, is uniformly distributed in tissue fluid (6). Studies with germ free animals support the thesis that the enzymic hydrolysis of urea in mammals is effected by urease produced by their bacteria (7). Urease has been shown to stimulate antiurease production in rabbits which would produce a decline in blood ammonia following passive transfer to normal rabbits (5).

In the experiments herein reported, the effects of urease injections on body weight have been observed. Urease was crystallized from jackbean meal by the method of Kirk and Sumner (5) and twice recrystallized from 30 percent ethyl alcohol. There was no evidence of protein contamination in the urease preparations and the enzyme activity was determined as described by these authors. The enzyme dissolved in 0.85 percent sodium chloride was injected intraperitoneally into weanling male Sprague-Dawley rats having an initial weight of 40–50 g. Injections were made every other day for 28 days in doses starting at 10 units per kg. body weight and progressing to 25 units per kg. body weight. Each animal received a total of 30 units of urease. Control animals received intraperitoneal injections of 0.85 percent NaCl in equal volume at the time that the experimental animals were injected.

Two successive experiments have been conducted each with ten control rats and twenty experimental rats. The rats were individually housed in wire bottom cages. Water and food were provided ad libitum throughout the experimental period. The diet for both groups was compounded as follows: solvent extracted soybean meal (50% protein) 31.4; sucrose 50.4; fat (Crisco) 8; cellulose 4.5; salt mixture (U.S.P. XIV) 4.0; and vitamin mixture in sucrose 2.2. The vitamin mixture per 100 lb. of diet contained Vitamin A acetate, 900,000 units; Vitamin D (Viosterol) 100,000 units; dl-alpha tocopherol (250 I. U. per g.) 5 g.; ascorbic acid 45 g.; inositol 5 g.; choline chloride, 75 g.; menadione 2.25 g.; para-amino benzoic acid 5 g.; niacin 5 g.; riboflavin 1 g.; pyridoxine-HCl 1 g.; thiamine-HCl 1 g.; calcium pantothenate 3 g.; biotin 20 mg.; folic acid 90 mg.; and Vitamin $B_{12}$ 1.35 mg. This diet was chosen since the growth effect of antibacterial agents is more commonly observed on vegetable protein diets (1, 2, 4) or on diets which are marginal in essential nutrient content. It was reasoned that if the enzyme injections were to stimulate growth that such an effect would be more easily demonstrated on this diet than on the casein diet previously employed (10). Feed intakes were determined every other day and the animals were weighed once weekly. The experiments lasted 8 weeks from the first day of injection.

Table 1 presents the results of both experiments. The difference in average weight gains between control and treated animals for 0–4 weeks is in each case rather small compared to its standard error. Since the rats had initially been distributed between control and experimental groups so as to make the average initial weight nearly identical, it was thought that this effect might represent a close dependence between weight gain and initial weight. Analysis of covariance, however, demonstrated dependence on initial weight to be negligible and the adjusted estimates deffered only trivially from those not adjusted. The figures shown in Table 1 are not adjusted for initial weight. Gains in body weight and grams of feed required per gram of gain are shown for 0–4 weeks, 4–8 weeks and 0–8 weeks in both experiments. No differences were observed in gain or feed required per gram of gain in the 0–4 week or injection periods. In Experiment I, the average gain during the 4–8 week period was 97.0 gram for the control animals and 107.8 gram for the experimental animals. Corresponding values for Experiment II were 101.9 and 110.1. Although the urease treated animals gained somewhat more weight, on the average, than did the controls, there was appreciable variation from rat to rat and none of the weight gain differences are statistically significant. However, the feed intake was closely related to weight gain and the feed required per gram of weight gain was significantly less for urease treated than for control rats. In each experiment the feed required per gram of weight gain was about 10 percent less for the urease treated rats than for the control rats when calculated over the 4–8 week period (4.71 grams per gram of gain versus 5.37 grams per gram of gain in Experiment I and 4.59 versus 5.01 in Experiment II). In each experiment this difference is significant at the 5 percent level. The increase in efficiency of food conversion to body gain in the last 4 weeks of both experiments was responsible for overall differences in efficiency of food conversion for the entire 8 week experimental period (3.51 grams of feed per gram of gain versus 3.72 in Experiment I and 3.41 versus 3.58 in experiment II). These differences are significant at the 5 percent level. A combined test of significance using the data for both experiments demonstrated at a 1 percent level of probability that the animals receiving urease injections required less feed per gram of gain.

At sacrifice there were no gross differences observed between the organs of the immunized animals and their controls. Weights of the adrenals, liver, spleen and kidneys were not different between control rats and immunized rats. Pooled sera drawn from the immunized animals was found to contain 2.5 units of antiurease per ml. The antisera protected normal rats against fatal doses of urease and inhibited the ureolytic activity of a phosphate buffer extract of gastrointestinal contents from these animals. Before sacrifice four randomly selected animals of the control group and eight of the immunized group were studied for in vivo C–14 urea metabolism after having food and water withheld for 16 hours. The immunized animals metabolized less C–14 urea as demonstrated by expired $C^{14}O_2$. Results of Experiment I have been presented for publication in abstract form (11).

TABLE 1

*Growth of Male Sprague Dawley Rats Injected With Jackbean Urease* [1]

EXPERIMENT I

|  | Controls | Experimentals |
|---|---|---|
|  | Grams | Grams |
| Initial wt | [2] 39.2±1.3 | 40.6±0.4 |
| Gain: |  |  |
| 0–4 wk | 151.2±6.0 | 154.0±4.2 |
| 4–8 wk | 97.0±4.9 | [4] 107.8±3.9 N.S. |
| 0–8 wk | 248.2±7.1 | [4] 261.8±6.9 N.S. |
| Feed per g. gain: |  |  |
| 0–4 wk | 2.73±0.07 | 2.69±0.04 |
| 4–8 wk | 5.37±0.29 | [3] 4.71±0.12 |
| 0–8 wk | 3.72±0.06 | [3] 3.51±0.05 |

EXPERIMENT II

| Initial wt | 56.9±1.2 | 57.2±0.8 |
|---|---|---|
| Gain: |  |  |
| 0–4 wk | 151.4±4.4 | 150.1±2.7 |
| 4–8 wk | 101.9±2.8 | 110.1±2.8 N.S. |
| 0–8 wk | 253.3±5.6 | 260.2±4.7 N.S. |
| Feed per g. gain: |  |  |
| 0–4 wk | 2.63±0.04 | 2.57±0.03 |
| 4–8 wk | 5.01±0.13 | [3] 4.59±0.09 |
| 0–8 wk | 3.58±0.04 | [3] 3.41±0.03 |

[1] There were 10 control rats and 20 experimental rats in each experiment.
[2] Standard error of the mean.
[3] Significant at 5% level.
[4] Not significant at 5% level.

Various changes and modifications of the invention can be made and, to the extent that such variations incorporate the spirit of this invention, they are intended to be included within the scope of the appended claims.

(1) Braude, R., Kon, S. K. and Porter, J. W. G., Nutr. Abstr. and Rev. 23:473, 1953.
(2) Frost, D. V., Orevley, L. R., Spruth, H. C., J. Agric. Food Chem. 3:235, 1955.
(3) Gyorgy, P., Ann. Nutr. Alimentation 11:A189, 1957.
(4) Jukes, T. M. Antibiotics in Nutrition, Medical Encyclopedia, Inc. New York, 1957.
(5) Kirk, J. S. and Sumner, J. B., J. Biol. Chem. 94:21, 1931.
(6) Kornberg, H. L., Davies, R. E. and Wood, D. R. Biochem. J. 56:363, 1954.
(7) Levenson, S. M., Crowley, L. V., Horowitz, R. E. and Malm, O.J.J. Biol. Chem. 234:2061, 1959.
(8) Phear, E. A. and Ruebner, B. Brit. J. Exptl. Path. 37:253, 1956.
(9) Sherlock, S. Amer. J. Med. 24:805, 1958.
(10) Visek, W. J., Baron, J. M. and Switz, D.M.J. Pharmacol. & Exptl. Therapeut. 126:359, 1959.
(11) Visek, W. J. and Dang, H. Fed. Proc. 19:325, 1960.

What is claimed is:
1. A method for increasing the feeding efficiency and rate of growth of a growing animal, consisting of subcutaneously injecting into the animal during its period of growth a starting dose of urease substantially below the normal lethal dose and thereafter at regular intervals during said period subcutaneously injecting progressively larger doses of urease until a final dose below the normal lethal dose has been injected, thereby increasing the feeding efficiency and rate of growth of the animal.
2. A method for increasing the feeding efficiency and rate of growth of a growing animal, comprising subcutaneously injecting into the animal during its period of growth a starting dose of urease substantially below the normal lethal dose and thereafter at regular intervals during said period subcutaneously injecting progressively larger doses of urease until a final dose about one-third the normal lethal dose has been injected, thereby increasing the feeding efficiency and rate of growth of the animal.

3. The method of claim 1 where the starting dose is about 10 units of urease activity per kilogram of body weight of the animal, and the final dose is about 25 of such units per kilogram of body weight.

References Cited in the file of this patent

Sumner et al.: "Chemistry and Methods of Enzymes," 3rd ed., 1953, pages 49, 156–161.